Feb. 27, 1962 E. H. TURNER 3,023,379
TRANSVERSELY MAGNETIZED NON-RECIPROCAL MICROWAVE DEVICE
Filed Feb. 27, 1953 2 Sheets-Sheet 1

INVENTOR
E. H. TURNER
BY
H. O. Wright
ATTORNEY

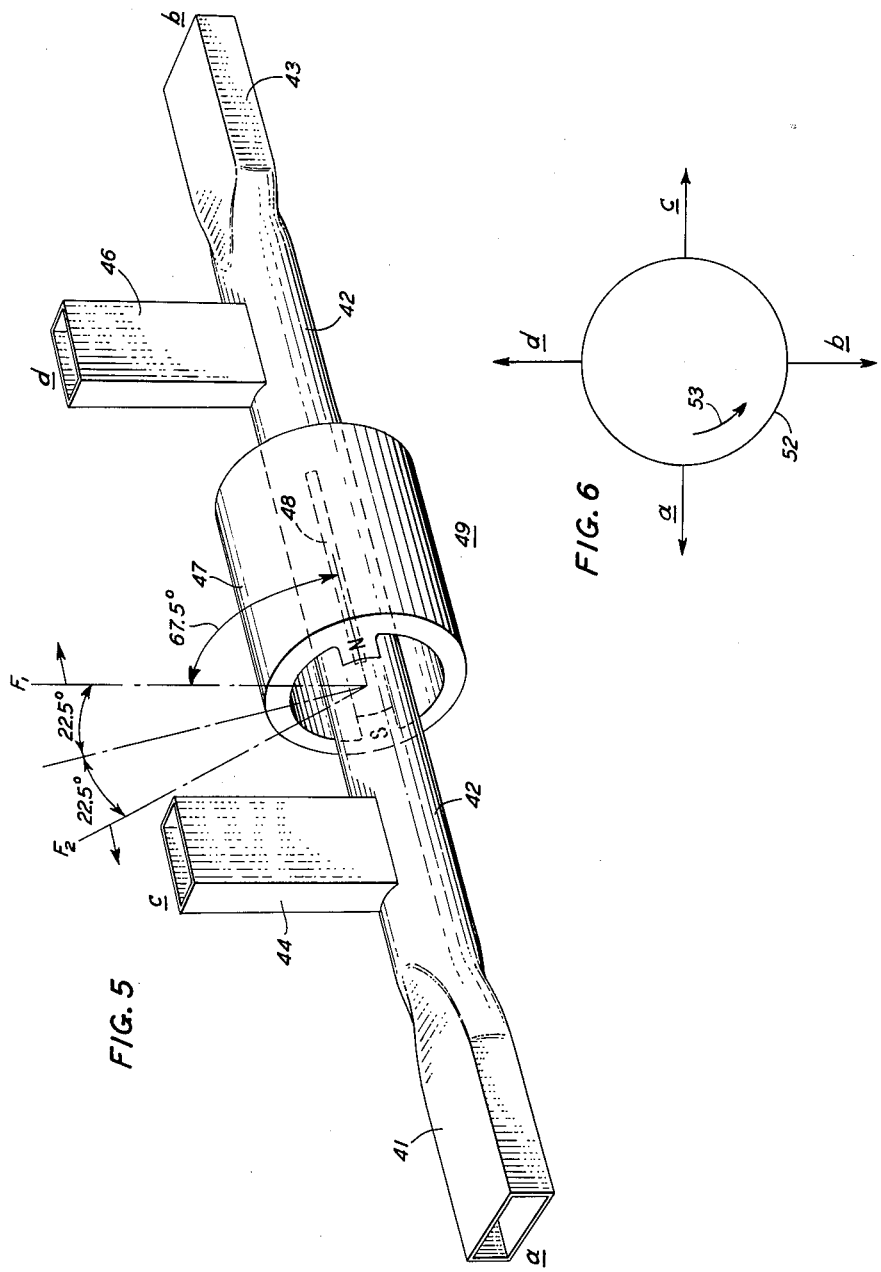

United States Patent Office 3,023,379
Patented Feb. 27, 1962

3,023,379
TRANSVERSELY MAGNETIZED NON-RECIPROCAL MICROWAVE DEVICE
Edward H. Turner, Red Bank, N.J., assignor to Bell Telephone Laboratories, Incorporated, New York, N.Y., a corporation of New York
Filed Feb. 27, 1953, Ser. No. 339,289
19 Claims. (Cl. 333—9)

This invention relates to non-reciprocal wave transmission devices and, more particularly, to devices producing and utilizing a non-reciprocal rotation of the plane of polarization of plane polarized electromagnetic wave energy.

There are several different phenomena which each involve a rotation of the plane of polarization of polarized wave energy. Each of these have interesting similarities and important differences. As is well known, transmission of plane polarized energy through a "birefringent" or "birefractive" medium, as for example a medium composed of one of several crystalline materials, will rotate the plane of polarization of the energy. This phenomenon was first observed in connection with polarized light waves and much of the optical terminology has been carried over into the analysis of devices operating with other forms of wave energy. In the case of electromagnetic wave energy the particular type of birefringent device suitable therefor has been more descriptively referred to as a "180 degree differential phase shift section." A birefringent rotation is reciprocal in that the rotation of a wave experienced in passing through the medium in a first direction will be cancelled if the wave is reflected back through the medium to the source.

Another known type of rotation, called the "Faraday effect," has been called antireciprocal to distinguish it from the reciprocal rotation produced by the birefringent medium. In Faraday rotation the angle of rotation continues in the same direction when the wave is reflected back along its path. Thus, the polarization of a wave passing through the medium first in one direction and then in the other undergoes two successive space rotations in the same sense, thereby doubling the rotation undergone in a single passage.

In an article, "The Microwave Gyrator," in the Bell System Technical Journal, January 1952, and in his copending application for patent, Serial No. 252,432, filed October 22, 1951, now U.S. Patent 2,748,353, issued May 29, 1956, C. L. Hogan disclosed that an element of ferromagnetic material in the presence of a magnetic field produces an antireciprocal rotation of a plane polarized electromagnetic wave when the wave is progagated parallel to and along the direction of the magnetic field.

A more general type of rotation may be termed "non-reciprocal rotation" although no medium producing it has been known heretofore. A non-reciprocal rotation would be one in which a given angle of rotation is experienced in passing through the medium in a first direction, and either no rotation at all or a different angle of rotation in passing back through the medium to the source.

It is an object of the present invention to produce a non-reciprocal rotation of plane polarized electromagnetic wave energy.

It is a further object of the present invention to produce an antireciprocal rotation of plane polarized electromagnetic wave energy by new and improved apparatus.

In accordance with the invention, a 180 degree differential phase shift section is constructed which employs as the active element therein an element of ferromagnetic material. As in prior birefringent devices, a controllable rotation of the plane of polarization of electromagnetic wave energy is produced when the wave is passed through the medium. As will be shown, this rotation is dependent upon the relationship between the incident polarization of the energy and the birefringent axes of the section. However, because of the unusual properties of the ferromagnetic material in the presence of a magnetic field; and because of the particular physical relationship provided between the ferromagnetic element, the applied magnetic field and the field pattern of the wave energy, the birefringent axes for opposite directions of transmission through the rotator are displaced from one another by an amount proportional to the strength of the magnetic field. With proper adjustment, as will be described in detail hereinafter, the non-reciprocal angle of rotation for each direction of transmission through the rotator may be separately selected. In the particular case for which these angles are equal, a non-reciprocal rotation is experienced which is in many respects equivalent to the antireciprocal rotation produced by a Faraday-effect element. As such, the rotator of the present invention may be employed for the Faraday-effect rotator in any of the several combinations already known.

One of the more useful of these combinations is a four branch microwave coupling network in which the antireciprocal property of the Faraday element is employed to establish a non-reciprocal connection between the several branches of the network. Each branch is connected to one other branch only for a given direction of transmission through the network, but to a different branch for the opposite direction of transmission. This network has been called a "circulator" circuit.

One feature of the present invention resides in an improved circulator circuit made possible by the non-reciprocal property of the rotator in accordance with the invention.

These and other objects and features of the invention, the nature of the present invention and its advantages, will appear more fully upon consideration of the various specific illustrative embodiments shown in the accompanying drawings and the following detailed description of these embodiments.

In the drawings:

FIG. 1 is a perspective view of a non-reciprocal rotator for electromagnetic wave energy in accordance with the invention;

FIG. 2, given for the purpose of explanation, is a schematic representation of a reciprocal 180 degree differential phase shift rotator;

FIG. 5 is a perspective view of a non-reciprocal multi-branch network or circulator in accordance with the invention; and FIG. 6, given for the purposes of explanation, is a diagrammatic representation of the coupling characteristics of the circulator of FIG. 5.

Figure 1:
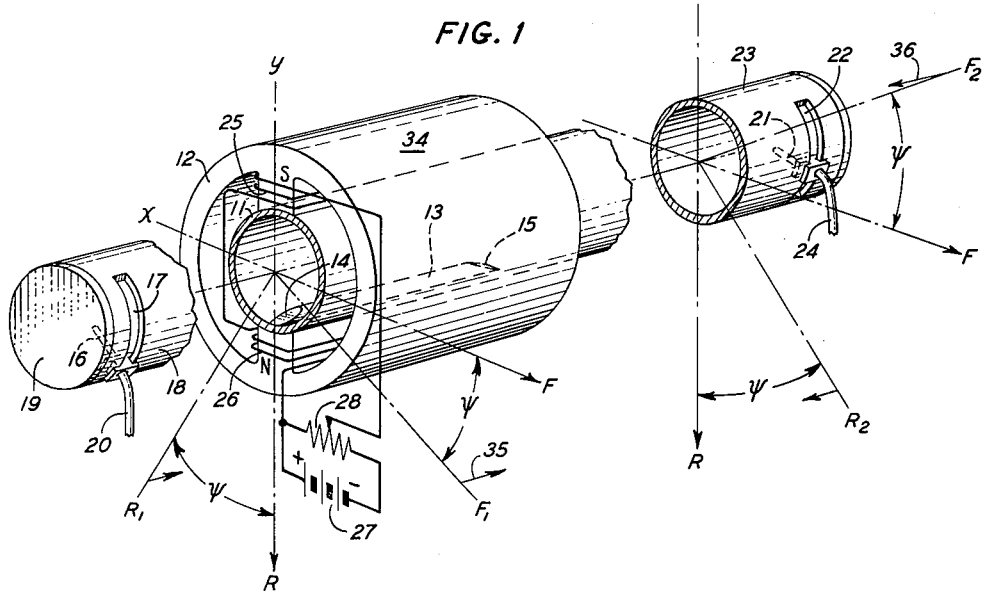

In more detail, FIG. 1 illustrates an embodiment of a non-reciprocal rotator in accordance with the invention comprising a section 11 of metallic shield transmission line or wave guide which may either be square or of circular cross-section as illustrated. In either event the cross-sectional dimension of guide 11 is preferably chosen so that only the various polarizations of the dominant mode of wave energy therein can be propagated. Surrounding guide 11 is a suitable means for producing an adjustable magnetic field, transverse to the axis of guide 11. As illustrated, this field passes through guide 11 in a vertical direction and is supplied by solenoid structure 34 comprising a suitable core 12 having concentrated pole pieces N and S bearing against the outside wall of guide 11 along narrow, oppositely disposed areas. Turns of wire 25 and 26 are placed about the pole pieces and are energized by a variable direct current from a source comprising rheostat 28 and battery 27. This field, however, may be supplied by an electrical solenoid with a metallic core of other suitable physical design or by a solenoid without a core. Furthermore, the field may be supplied by a permanent magnet of suitable strength. Guide 11 is adapted to be interposed between suitable transmission means for supporting linearly polarized electromagnetic waves and for coupling these waves with any desired polarization to guide 11. This means is illustrated schematically on FIG. 1 by a radial probe 16 extending through a circumferential slot 17 in the wall of extension 18 of guide 11. Probe 16 is located an appropriate distance from end plate 19 of extension 18 to launch those waves only in guide 11 that are polarized in the plane of the probe. Probe 16 is connected to a related transmission system by flexible conductor 20 so that the probe may be inclined in extension 18 at any desired angle. A similar probe 21, extending through slot 22, is located at the other end of guide 11 in extension 23 thereof to abstract waves from guide 11 having a polarization parallel to probe 21 and apply them to conductor 24. A plurality of such probes may be employed, if desired, at either end to accept and launch waves of other polarizations.

Located along the lower inside wall surface of guide 11 and extending longitudinally therein for several wavelengths in the presence of the field from magnet 12 is a strip-like or rod-like element 13 of ferromagnetic material. A suitable shape for element 13 may be arrived at by starting with a cylinder of ferromagnetic material cross-sectional dimension small with respect to the cross-section of guide 11, sanding or otherwise suitably cutting a longitudinal flat on one side to fit snugly against the internal surface of guide 11 and cutting pointed tapers 14 and 15 at each of the ends of element 13. Element 13 is suitably bonded in this position to the inside wall of guide 11.

Element 13 may be made of any of the several ferromagnetic materials which each comprise an iron oxide with a small quantity of a bivalent metal such as nickel, magnesium, zinc, manganese or other similar material, in which the other metals combine with the iron oxide in a spinel structure. This material is known as a ferromagnetic spinel or a ferrite. On the basis of their electrical properties, a particularly suitable designation of this class of materials is "gyromagnetic" to designate materials having magnetic moments capable of being aligned by an external magnetic field and capable of exhibiting the precessional motion of a gyroscopic pendulum. In usual practice, these materials are first powdered and then molded with a small percentage of plastic material, such as Teflon or polystyrene. As a specific example, element 13 may be a strip of nickel-zinc ferrite prepared in the manner described in the above-mentioned publication and copending application of C. L. Hogan.

The length and thickness of element 13 are adjusted in the absence of a magnetic field to produce a 180 degree differential phase shift section that has the property of producing a time phase delay which is greatest to wave energy having its lines of electric force parallel to a principal axis of the section and least to wave energy perpendicular to this axis, and therefore, to introduce a time phase difference between the two components by retarding one relative to the other. These axes correspond to the axes of refraction of a conventional birefringent transmission medium. Since element 13 has a dielectric constant which is substantially greater than unity and since the phase velocity of a wave is influenced by the dielectric constant presented by the material to the component of the electric vector of the wave which passes through the material, a vertically polarized wave passing through guide 11 will exhibit a lower phase velocity than a horizontally polarized wave. This is illustrated on FIG. 1 by a horizontal axis F representing the fast axis of propagation through guide 11 and a vertical axis R representing the retarded axis of propagation. In accordance with the invention, the relative phase shift between two linearly polarized wave components having their polarizations parallel to axes F and R, respectively, is equal to 180 degrees in the absence of a magnetic field.

In a typical embodiment designed to operate in the frequency range of 24,000 megacycles for which the internal diameter of guide 11 is 11/32 inch, an element composed of between 80 to 85 percent powdered ferromagnetic material by weight suspended in molded dielectric material such as polystyrene or Teflon, this element having a maximum cross-sectional dimension of 1/8 inch, required a length of about one inch to provide this phase shift. Of course, other relative dimensions will serve equally well. In general, as the length of the element is decreased, its cross-sectional area should be increased.

Thus far, the effect of the dielectric constant of element 13 has been considered alone by assuming a magnetic field of zero. As the ferromagnetic material of element 13 is excited by a transverse magnetic field, such as produced by magnet means 34, the permeability constant of the material will change for wave energy components having a given polarization relative to the magnetic field. This may be explained theoretically by the assumption that the ferromagnetic material contains unpaired electron spins which tend to line up with the applied magnetic field. These spins and their associated moments then precess about the line of the applied magnetic field, keeping an essentially constant component of magnetic moment in the applied field direction but providing a magnetic moment which rotates about the applied field direction. An electromagnetic wave having its magnetic vector in the direction of the magnetic field will be unable to reorient the electron spins to any appreciable extent, and hence, will see a permeability close to unity regardless of the strength of the magnetic field. An electromagnetic wave having a magnetic vector component which rotates predominantly counter-clockwise in a plane normal to the applied magnetic field when viewed from the north pole of the magnet producing the field will have its magnetic field influenced by element 13 so that element 13 presents to such a wave a permeability greater than unity. On the other hand, a wave having a magnetic vector component which rotates in a predominantly clockwise sense when viewed in the same fashion will be similarly influenced but element 13 will have for such a wave a permeability less than unity (assuming that the applied magnetic field strength is lower than that required for ferromagnetic resonance). The amount of difference from unity in each case will depend on the strength of the magnetic field which may be adjusted to the precise value to be defined hereinafter in the region below that strength which produces ferromagnetic resonance in element 13 at the frequency of the applied wave energy. As described in detail in the above-mentioned Hogan publication, when the field necessary for ferromagnetic resonance is approached, the attenuation of the clockwise rotating component becomes larger and larger until eventually only the counterclockwise rotating component will be propagated. Thus a field strength in this region must be avoided. Element 13 may obviously be permanently magnetized to any particular predetermined strength if desired.

Consider now the effect of this permeability of element 13 alone upon an electromagnetic wave, overlooking for the moment the dielectric effect of element 13 described above. Thus, if a linearly polarized dominant mode wave is applied at the left end of guide 11 polarized at an arbitrary acute angle $\psi$ with respect to the axis F, such as a polarization represented by the axis $F_1$ on FIG. 1, this wave will have a magnetic field component at the position of element 13 which changes direction as the wave travels and will appear to rotate 360 degrees during the time taken for the wave to travel one wavelength. To the extent that the magnetic field does thus appear to rotate as the wave propagates, it is referred to in the art as having a component that is circularly polarized. This wave has a magnetic field component at the position of element 13 which rotates clockwise when viewed from the direction of the magnetic pole N looking towards pole S. If a similar wave is applied to guide 11 polarized at an arbitrary acute angle $\psi$ with respect to the axis R, such as represented by the axis labeled $R_1$ on FIG. 1, this wave will have a magnetic component which rotates counterclockwise when viewed from pole N. In general, there will also be a change in magnitude of the magnetic vector as it rotates, but the sense of rotation determines whether the permeability of element 13 will be greater than or less than unity in an applied magnetic field. Since the phase velocity of a wave whose magnetic field passes through a material depends on the permeability constant of the material, a wave traversing the ferromagnetic material of element 13 with its electric vector polarized parallel to $F_1$ will exhibit a higher phase velocity than that of a wave polarized parallel to $R_1$. Thus, the effect of the permeability of the magnetized ferrite alone, produces a maximum phase velocity for a wave propagating from left to right which is polarized at 45 degrees between the axes R and F in the lower forward quadrant of FIG. 1. The corresponding minimum phase velocity is found for waves polarized at 45 degrees in the lower-back quadrant of FIG. 1. As the applied field is increased from zero, the smaller phase velocity decreases and the larger increases.

The total effect of both the dielectric and permeability phenomena may now be considered. As noted above in the discussion of the dielectric effect alone, of the various possible planes of polarization, the wave with its electric vector polarized along axis R has the lowest phase velocity in the absence of an applied magnetic field due to the dielectric constant of element 13. For this polarization the permeability constant of element 13 is unity when the applied magnetic field is zero. Since the effect of the dielectric is constant and tends to cause a minimum phase velocity in the plane of the axis R, the superposition of the dielectric and permeability effects causes an actual minimum phase velocity to occur along the axis $R_1$ which is displaced from the axis R by an angle $\psi$ proportional to the strength of the magnetic field. As the applied magnetic field is increased, the permeability effect is increased and the angle $\psi$ increases up to a maximum of 45 degrees. This maximum angle of rotation of the axes represents the purely magnetic birefringence.

With a magnetic field of the polarization illustrated in FIG. 1, the fast and slow axes $F_1$ and $R_1$, respectively, for transmission from left to right are rotated clockwise as viewed facing in the direction of propagation of the wave. Similarly for a wave propagating from right to left by an argument identical with that used for propagation from left to right and with a magnetic field applied as indicated in FIG. 1, the axes of fast and retarded phase velocity will be shifted clockwise from their zero field positions since a wave propagating in this right to left direction will have circularly polarized magnetic field components at the position of element 13 which rotate in the opposite sense from the corresponding components of the wave analyzed for propagation from left to right. Thus, in space the absolute rotations of the birefringent axes of phase shift are opposite for opposite directions of propagation, i.e., the fast axis, labeled $F_1$ on FIG. 1, for propagation through guide 11 from left to right (indicated by arrow 35) is shifted into the lower-forward quadrant, while the fast axis, labeled $F_2$ on FIG. 1, for propagation from right to left (indicated by arrow 36) is shifted into the upper-forward quadrant. The retarded axes, labeled $R_1$ and $R_2$, respectively, are similarly shifted. A reversal of the polarity of the magnetic field will reverse the direction of shift. While the absolute magnitude of the phase shift along any axis changes with change in the applied field, the relative difference between the slow and fast axes, for transmission through the portion of guide 11 which includes element 13, remains substantially at the 180 degrees in time phase as was found in the absence of a magnetic field.

Carrying over the optical terminology, guide 11 and element 13 when excited by a transverse magnetic field remain a birefringent transmission medium, except, however, that the axes of refraction for one direction of propagation through the medium are different from the axes of refraction for the opposite direction of propagation. In electrical terms, the plane of greatest phase velocity of the 180 degree differential phase shift section encountered by wave energy passing through the section in one direction is inclined at an angle to the plane of greatest phase velocity for the opposite direction of transmission through the section.

Before proceeding with the detailed examination of the space rotations produced by the non-reciprocal rotator of FIG. 1, certain properties of an ordinary 180 degree differential phase shift section must be examined. This examination may most readily be made with reference to the schematic representation of FIG. 2 which shows the 180 degree differential phase shift element 37 having a fast axis F, designating the electric polarization of wave energy having the greatest phase velocity, extending vertically through the element and a retarded axis R, designating the electric polarization of wave energy of least phase velocity, extending horizontally through the element.

Figure 2:
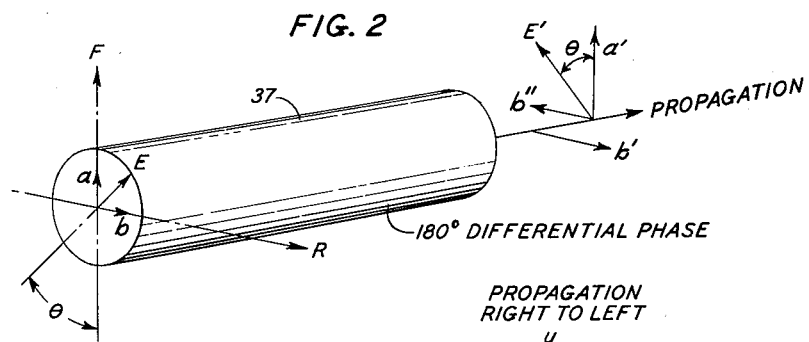

Referring, therefore, to FIG. 2, assume that linearly polarized waves represented by the vector E are being introduced from the left of the section, and that these waves are polarized at an angle $\theta$ clockwise from axis F. Vector E may be resolved into components $a$ and $b$ along axes F and R, as shown on FIG. 2. Since the F axis component travels at a higher speed than the R axis component, upon emerging from the right end of the section, vector $b'$ lags behind $a'$ by 180 degrees in time. Hence, at the position of $a'$, the R axis component will be reversed in time phase and so will be pointing in the opposite direction, as indicated by $b''$. Now when $a'$ and $b''$ are added vectorially, the resultant will be a linearly polarized wave represented by E' polarized at an angle $\theta$ counterclockwise from the fast axis F. Thus, the effect of the 180 degree differential phase shift section upon linearly polarized waves is to cause a reciprocal rotation of the angle of polarization in the direction of the fast axis by $2\theta$, or twice the angle between the fast axis and the input polarization. The retarded axis could equally well have been chosen as the reference axis and the same result would have been obtained, but for the purposes of convenience the fast axis will be employed as the sole reference in the discussion which follows.

Referring again to the non-reciprocal rotator of FIG. 1, in operation in accordance with the invention a linearly polarized wave of arbitrary space polarization such as that generated by probe 16, may be applied at the left of guide 11. For propagation from left to right, this wave experiences a space rotation of twice the angle that the incident wave makes with the fast axis $F_1$ in a given direction as viewed facing in the direction of propagation. If the wave is sent back through the rotator of FIG. 1 from right to left, it receives a further space rotation in the same absolute direction, so that it returns to the left end of guide 11 displaced from the incident wave by an angle that is four times the angle of shift produced by the magnetic field of the fast axis $F_1$ from its no field position F, as will be demonstrated more fully below. Thus, the total round trip space rotation may be controlled by the strength of the magnetic field. The fraction of this rotation that occurs during either passage through the rotator is controlled by the angle which the incident polarization of the wave makes with the applied magnetic field and the axial plane passing through the element 13.

This operation may be understood more clearly by reference to the vector representations of FIGS. 3 and 4, having in mind the properties of a reciprocal 180 degree differential phase shift section explained with reference to FIG. 2. Thus, on FIG. 3 the fast axis $F_1$ for propagation from left to right through guide 11 of FIG. 1 is illustrated. The angle $\psi$ which the axis $F_1$ makes with the $x$ axis is determined by the strength of the applied transverse magnetic field. Vector 30 represents an electromagnetic wave applied with the arbitrary space polarization of probe 16 to the left-hand end of guide 11. The angle $\theta$ represents the incident angle between vector 30 and the $F_1$ axis. The effect of the differential phase shift property is to cause a rotation of the polarization of wave energy in the direction of the $F_1$ axis by $2\theta$, placing the polarization of wave energy leaving the right-hand end of guide 11 at that represented by vector 31 which is made that of probe 21.

Figure 3:
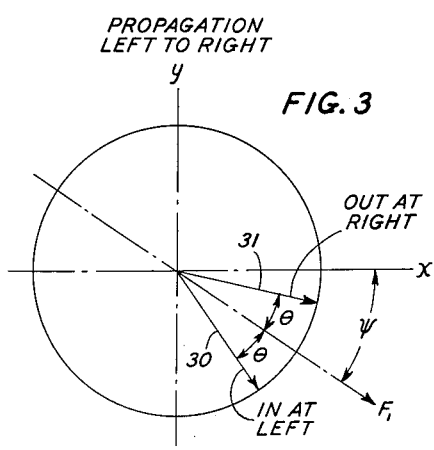
FIG. 3 is a vector representation of wave energy polarizations in the rotator of FIG. 1 for propagation from left to right therethrough.
Figure 4:
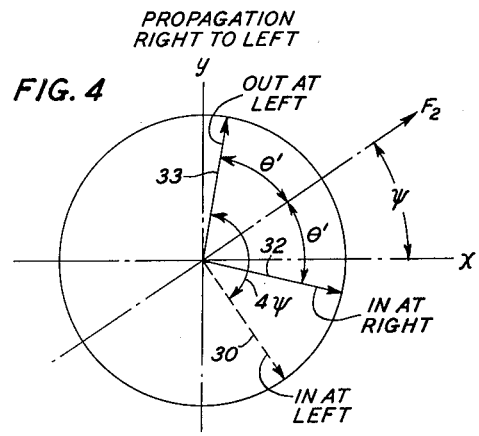
FIG. 4 is a vector representation of wave energy polarizations in the rotator of FIG. 1 for propagation from right to left therethrough.

On FIG. 4, $F_2$ represents the fast axis of propagation from right to left through guide 11 of FIG. 1. The angle $\psi$ between the $F_2$ axis and the $x$ axis is now in the opposite direction from the corresponding angle in FIG. 3. Vector 32 represents a wave applied to the right-hand end of guide 11 by probe 21 with the same polarization as the wave heretofore described as leaving the right-hand end of guide 11. The angle $\theta'$ represents the angle between vector 32 and the $F_2$ axis. The effect of the differential phase shift property is to cause a further rotation of the angle of polarization in the direction of the $F_2$ axis by $2\theta'$, placing the polarization of wave energy leaving the left-hand end of guide 11 at that represented by vector 33 displaced from the position of probe 16.

The total round-trip space rotation is equal to $$2\theta + 2\theta' \quad (1)$$

but $$\theta' = 2\psi - \theta \quad (2)$$

so that the total space rotation may be expressed $$2\theta + 2(2\psi - \theta) = 4\psi \quad (3)$$

or four times the angle of shift produced by the magnetic field in the position of the fast axis of propagation.

If the incident polarization for one direction of propagation is coincident with the fast axis for that direction of propagation, for example if the polarization represented by vector 30 of FIG. 3 lies along the axis $F_1$ for left to right propagation, then there is no rotation produced for that direction of propagation and the entire rotation of $4\psi$ is found in the reverse direction. Conversely, if the incident angle is $2\psi$, then the full $4\psi$ rotation is produced in the first direction with none produced on the return passage. Either of these conditions represents the fully non-reciprocal property of the rotator in accordance with the invention. If, however, the angle between the incident polarization and the fast axis for that direction of propagation is equal to the angle of shift produced by the magnetic field, the rotations for each direction of propagation are equal and of the same sense. Under this condition the rotation produced by the non-reciprocal rotator of the present invention resembles the antireciprocal rotation produced by a Faraday-effect device. In so far as this is true, the non-reciprocal rotator of the present invention may replace the Faraday-effect rotator in the combinations disclosed by Hogan in the above-mentioned publication and copending application, and in other devices known to the art which make use of the antireciprocal Faraday-effect rotation. Without in any way attempting to mention more than a few typical examples of this possible substitution for the purposes of illustration, it may be noted that the rotator of the present invention may be employed in the combinations disclosed in the copending applications of A. G. Fox, Serial No. 288,288 filed May 16, 1952; Serial No. 263,629, filed December 27, 1951, now U.S. Patent 2,760,166, issued August 21, 1956; Serial No. 263,630, filed December 27, 1951, now U.S. Patent 2,746,014, issued May 15, 1956; in the copending application of W. W. Mumford, Serial No. 263,656, filed December 27, 1951, now U.S. Patent 2,769,960, issued November 6, 1956, and in the copending application of S. E. Miller, Serial No. 263,600, filed December 27, 1951, now U.S. Patent 2,748,352, issued May 29, 1956.

Several advantages of such substitution may be mentioned. In the prior art Faraday-effect devices, a ferromagnetic element is placed in the center of the wave guide and in the center of the electromagnetic field pattern so that substantial components of the energy must pass through the element. Since the ferromagnetic materials inherently have a certain amount of loss, a certain amount of the wave power may be dissipated in the material presenting the consequent problem of transfer of the heat produced thereby away from the element. In the present structure, however, the ferromagnetic material is located at the side of the guide resulting in a smaller amount of the wave energy being dissipated in the material. Furthermore, since the ferromagnetic material is in contact with the waveguide walls, the problem of heat dissipation is minimized.

Referring to FIG. 5, a particular application of the non-reciprocal polarization rotator of FIG. 1 is illustrated by its use in a non-reciprocal four branch microwave network of the type hereinbefore designated as a "circulator" circuit. This network comprises a circular wave guide 42 which tapers smoothly and gradually from its left-hand end into a rectangular wave guide 41 and which is joined near said end by a second rectangular guide 44 in a shunt or H-plane junction. The rectangular wave guides 41 and 44 will accept and support only plane waves in which the component of the electric vector, which determines the plane of polarization of the wave, is consistent with the dominant $TE_{10}$ mode in rectangular wave guide. Likewise, the dimension of guide 42 is preferably chosen so that only the several polarizations of the dominant $TE_{11}$ mode in it can be propagated. By means of the smooth transition from the rectangular cross-section of guide 41 to the circular cross-section of guide 42, the $TE_{10}$ mode, that wave energy having a plane of polarization parallel to the narrow dimension of the rectangular cross-section of guide 41, may be coupled to and from the $TE_{11}$ mode in circular guide 42 which has a similar or parallel polarization. Any other polarization of wave energy in guide 42 will not pass through the polarization-selective terminal comprising guide 41. Guide 44 is physically oriented with respect to guides 41 and 42 so that the $TE_{10}$ mode in guide 44 is coupled by way of the shunt plane junction between the rectangular cross-section of guide 44 and the circular cross-section of guide 42 into the particular $TE_{11}$ mode in circular guide 42 which is polarized perpendicular to the $TE_{11}$ mode introduced by guide 41. Thus, guides 41 and 44 comprise a pair of polarization-selective connecting terminals by which wave energy in two orthogonal $TE_{11}$ mode polarizations may be coupled to and from one end of guide 42. Furthermore, these guides comprise a pair of conjugately related terminals or branches inasmuch as a wave launched in one will not appear in the other.

At the other end of guide 42 is a similar pair of polarization-selective conjugate terminals comprising rectangular guides 43 and 46 coupled to orthogonally related waves in guide 42 which waves are polarized parallel to the planes of the corresponding waves, respectively, to which guides 41 and 44 are coupled. Thus, guide 42 tapers into a rectangular guide 43 which supports a wave polarized in the plane of polarization of the wave in guide 41. Guide 42 is joined in a shunt plane junction by a second rectangular guide 46 which is perpendicular to guide 42 and accepts waves of the same polarization as those accepted by guide 44.

Interposed between the first pair of conjugate terminals comprising guides 41 and 44 and the second pair of conjugate terminals comprising guides 43 and 46 in the path of wave energy passing therebetween in guide 42 is located an antireciprocal rotator 49 of the type shown in FIG. 1. The necessary transverse magnetic field is supplied by a permanent magnet structure 47 having its pole pieces inclined at a fixed 67.5 degree angle with respect to the polarization of wave energy in guide 41 and guide 43. Ferromagnetic strip 48 is located in this field which places strip 48 along a line displaced 67.5 degrees around the periphery of guide 42 from the position at which guides 44 and 46 are coupled. The strength of the magnetic field supplied by magnet 47 is adjusted to produce a 22.5 degree shift in the fast axes $F_1$ and $F_2$ from their no field position.

The operation of the circulator circuit of FIG. 5 may be conveniently explained with reference to the diagram of FIG. 6. Thus, a vertically polarized wave introduced at terminal $a$ into guide 41 travels past the aperture of guide 44 to rotator 49. Since the polarization of this wave is coincident with the $F_1$ axis of rotator 49, the polarization of the wave is unaffected and remains in the preferred direction for transmission unaffected past guide 46 and in the preferred polarization for passage through guide 43 to terminal $b$. Substantially free transmission is, therefore, afforded from terminal $a$ to terminal $b$ and this condition is indicated on FIG. 6 by the radial arrows labeled $a$ and $b$, respectively, associated with a ring 52 and an arrow 53, diagrammatically indicating progression in the sense from $a$ to $b$.

Should a wave having the same polarity as the wave heretofore described as leaving terminal $b$ by guide 43 be applied to guide 43, it will be transmitted unaffected past guide 46 to rotator 49. Since the polarization of this wave is now inclined 45 degrees with respect to the fast axis $F_2$ of rotator 49, the wave will be rotated 90 degrees in a clockwise direction as viewed from the direction of propagation by rotator 49 bringing the wave into a horizontal polarization at the aperture of guide 44 by which it will be accepted for passage to terminal $c$. This transmission is indicated by arrow 53 on FIG. 6 which tends to turn the arrow $b$ in the direction of the arrow $c$.

Should a wave having the same polarity as the wave heretofore described as leaving terminal $c$ by guide 44 be applied to guide 44, it will be launched in guide 42 in a polarization conjugate to guide 41 and will travel to rotator 49. This horizontally polarized wave is now perpendicular to the $F_1$ axis of rotator 49, and while its phase may be reversed, it will remain in a horizontal polarization on leaving rotator 49, the preferred polarization for passage by guide 46 to terminal $d$. This transmission is indicated by the arrow 53 on FIG. 6 which tends to turn the arrow $c$ in the direction of the arrow $d$. Similarly, if a wave having the same polarization as the wave heretofore described as leaving terminal $d$ by guide 46 is applied to guide 46, it will be launched in guide 42 in a horizontal polarization, will travel to rotator 49, where it is now inclined at an angle of 45 degrees with the axis $F_2$ and will be rotated 90 degrees in a clockwise direction bringing its plane of polarization into the preferred direction for transmission through guide 41 to terminal $a$. This passage is similarly indicated on FIG. 6 by the schematic coupling between terminals $d$ and 4. Thus, each terminal is coupled around the circle 52 of FIG. 6 to only one other terminal for a given direction of transmission but to another terminal for the opposite direction of transmission.

It is interesting to note that the physical orientation of the output branches 46 and 43 may bear any relation to the input branches 41 and 44 without changing the electrical operation of the circulator, so long as the position of element 48 within guide 42 and its field are properly chosen. Thus, if branch 43 together with 46 is twisted a given angle with respect to branch 41, and if magnet 47 and element 48 are rotated one-half as much in the same direction, the operation of the circulator will remain substantially as described. If the polarization of magnet 47 is reversed, all other components remaining as shown, the direction of arrow 53 should be reversed indicating an opposite coupling operation between terminals in the order $a$ to $d$, $d$, to $c$, $c$ to $b$, and $b$ to $a$.

In all cases, it is understood that the above-described arrangements are simply illustrative of a small number of the many possible specific embodiments which can represent applications of the principles of the invention. Numerous and varied other arrangements can readily be devised in accordance with these principles by those skilled in the art without departing from the spirit and scope of the invention.

What is claimed is:

1. In combination, a section of wave guide adapted to support electromagnetic wave energy in a plurality of planes of polarization, first and second polarization-selective wave-guide connections to said guide, said first connection adapted to couple to and from a first plane of polarization of said energy in said guide, said second connection adapted to couple to and from a second and different plane of polarization of said energy in said guide, said second plane bearing an angular relationship to said first plane, means interposed in said guide between said connections for rotating the polarization of wave energy passing therebetween from said first plane into said second plane for transmission from said first connection to said second connection and for translating said wave energy into a third plane of polarization for transmission in the opposite direction from said second connection, said third plane bearing a different angular relationship to said second plane than said angular relationship between said first and second planes, said means comprising a transmission medium loaded with gyromagnetic material polarized by an external magnetic field which extends substantially normal to the direction of propagation of said energy throughout said material to produce birefringent axes of refraction which are different for opposite directions of propagation of said energy therethrough, the refractive axis of said medium for transmission from said first connection to said second connection lying in a fourth plane which is both parallel to the direction of propagation of said wave energy and inclined between said first and second planes.

2. A non-reciprocal multibranch network comprising a wave guide adapted to support electromagnetic wave energy in a plurality of planes of polarization, first and second and third polarization-selective wave-guide connections to said guide, each of said connections adapted respectively to couple to and from first and second and third planes of polarization of said energy in said guide, a 180 degree differential phase shift section for orthogonal polarizations of plane of polarized wave energy interposed between said first and second connections on the one hand and said third connection on the other, said section being non-reciprocal in that it has a first plane of greatest phase shift for energy propagated in one direction through said section and a second plane of greatest phase shift for energy propagated in the opposite direction through said section, said first plane of phase shift being inclined at an angle to said second plane of phase shift, said first plane of phase shift being like related to said first and third planes of polarization, said second plane of phase shift being like related to said second and third planes of polarization.

3. A non-reciprocal multibranch network comprising a section of wave guide, a pair of polarization-selective wave-guide connections for said section adapted to couple to and from one of a pair of orthogonal polarizations of electromagnetic wave energy therein, at least one other polarization-selective wave-guide connection for said section adapted to couple to and from one of said pair of polarizations, a strip of gyromagnetic material located near the internal surface of said section between said pair of connections and said other connection, and means for applying a magnetic field to said element transverse to the direction of propagation of wave energy through said section.

4. A non-reciprocal multibranch network comprising a section of wave guide, a pair of polarization-selective wave-guide connections for said section each adapted to couple to and from one of a pair of orthogonal polarizations of electromagnetic wave energy therein, at least one other polarization-selective wave-guide connection for said section, a strip of gyromagnetic material located in said section between said pair of connections and said other connection, said strip located off the longitudinal axis of said section and positioned on an axial plane of said section lying between the planes of said orthogonal polarizations, and means for applying a magnetic field parallel to said axial plane and transverse to the direction of propagation of wave energy through said section.

5. In combination, a section of wave guide adapted to support electromagnetic wave energy in a plurality of planes of polarization, first and second polarization-selective wave-guide connections to said guide, said first connection adapted to couple to and from a first plane of polarization of said energy in said guide, said second connection adapted to couple to and from a second plane of polarization of said energy in said guide, means interposed between said connections for rotating the polarization of wave energy passing therebetween from said first plane into said second plane for transmission from said first connection to said second connection and into a plane other than said first plane for transmission in the opposite direction from said second connection, said means comprising an element of gyromagnetic material extending longitudinally in the path of said wave energy between said connections, and means for applying a magnetic field to said element, said element being asymmetrically located in the field pattern of said energy whereby in the absence of said field the phase of wave energy polarized parallel to a plane passing through said element is shifted with respect to the phase of wave energy polarized perpendicular to said plane passing through said element, the magnetic intensity of said field shifting said planes of phase shift from their last-named positions by one-quarter of the angle between said first plane and said other plane of polarization.

6. In a system including a guiding path for high frequency electromagnetic wave energy in which a similar pattern of orthogonal electric and magnetic fields is maintained for propagation in one direction therealong and for propagation in the opposite direction therealong in a frequency range including a given operating frequency, an element of gyromagnetic material extending longitudinally along said path for at least a wavelength of said energy at said operating frequency, and means for applying a magnetic field to said element of intensity less than that required to produce gyromagnetic resonance in said material, said element being centered in a region in the transverse cross section of said path in which the components of the high frequency magnetic field of said energy appear to rotate in respectively opposite senses for said two directions of propagation as viewed parallel to said applied magnetic field.

7. In a transmission system for high frequency electromagnetic wave energy, a definitively restricted directing path for said energy in which a pattern of orthogonal electric and magnetic fields is maintained in a frequency range including a given operating frequency, means for establishing a biasing magnetic field in said path having a direction perpendicular to the direction of propagation of said energy, and an element of material which when influenced by said biasing field presents substantially different permeability constants to polarized magnetic field components of said wave energy which appear to rotate in opposite senses as the wave propagates, said element extending longitudinally for at least a wavelength of said energy at said operating frequency in the path of said wave energy with a greater transverse extent at a location relative to said high frequency magnetic field pattern in which said circularly polarized components rotate predominantly in one sense in a plane normal to said applied field than in a location in which said components rotate in the opposite sense as said wave propagates in a given direction.

8. A non-reciprocal rotator of the plane of polarization of plane polarized electromagnetic wave energy, said rotator comprising a birefringent transmission medium which is adapted to support said energy in a plurality of polarizations at the operating frequency and which includes a differential phase shift section for orthogonal polarizations of said energy to shift the phase of energy polarized in a plane of maximum phase shift to a greater extent than wave energy polarized in a plane of minimum phase shift that is orthogonal to said plane of maximum phase shift, said medium having a first plane of maximum phase shift for energy propagated in one direction through said medium and a second plane of maximum phase shift for energy propagated in the opposite direction through said medium, said medium being non-reciprocal in having said first plane inclined at an acute angle to said second plane, and means for applying said plane polarized electromagnetic wave energy to said medium polarized at an acute angle with respect to at least one of said planes of maximum phase shift.

9. A non-reciprocal rotator of the plane of polarization of plane polarized electromagnetic wave energy, said rotator comprising an element located in the propagation path of said wave energy, said element being displaced from the longitudinal axis of said path and centered upon a unique axial plane of said path, means for applying said wave energy to said path polarized at an acute angle to said plane, said element having a permeability constant that departs from unity as the intensity of magnetization of said element is increased with the sense of said departure dependent upon the sense of said angle as viewed in the direction of propagation of said energy, said element having a fixed dielectric constant that retards the phase of components of said wave energy polarized in said plane 180 degrees with respect to components polarized perpendicular to said plane when the permeability constant of said element is substantially unity, and means for increasing the intensity of magnetization of said element whereby to retard the phase of components of said wave normal to said plane when said angle is of one sense and to advance the phase of said components when said angle is of the other sense.

10. In combination, a section of wave guide adapted to support linearly polarized electromagnetic wave energy in a plurality of planes of polarization, first and second polarization-selective wave-guide connections to said guide, said first connection adapted to couple to and from a first plane of polarization of said energy in said guide, said second connection adapted to couple to and from a second and different plane of polarization of said energy in said guide, said second plane bearing an angular relationship to said first plane, means interposed in said guide between said connections for rotating the polarization of wave energy passing therebetween from said first plane into said second plane for transmission from said first connection to said second connection and for translating said wave energy into a third plane of polarization for transmission in the opposite direction from said second connection, said third plane bearing a different angular relationship to said second plane than said angular relationship between said first and second planes, said means comprising a gyromagnetic transmission medium polarized by an external magnetic field which extends substantially normal to the direction of propagation of said energy throughout said material to produce birefringent axes of refraction for said linearly polarized wave energy, said axes being different for opposite directions of propagation of said energy therethrough, the refractive axis of said medium for transmission from said first connection to said second connection lying in a fourth plane which is both parallel to the direction of propagation of said wave energy and inclined between said first and second planes.

11. In combination, a section of metallic shield microwave transmission line, a strip of gyromagnetic material located nearer to the internal surface of said shield than to the longitudinal center line of said shield and magnetically polarized in a plane perpendicular to said center line, and means for coupling plane polarized electromagnetic wave energy to said section of line at a point beyond the end of said strip polarized at an acute angle to a plane extending through said center line and said strip.

12. In combination, a conductively bounded dominant mode electromagnetic wave energy guiding component having a boundary of substantially uniform transverse cross section and continuous conductivity, means for introducing said energy into said component at a first point with the electric field of said energy centered upon a plane which extends in the direction of propagation of said energy, a load for receiving the energy associated with said component at a second point, gyromagnetic material extending longitudinally in the path of and in energy coupling relationship with said energy between said points, said material occupying space between the conductive boundary of said component and one side of said plane to a substantially greater volumetric extent than on the other side of said plane, and means for magnetically polarizing said element in a direction normal to the longitudinal extent of said material.

13. In combination, a bounded wave guiding structure having a boundary of substantially uniform transverse cross section and continuous conductivity for dominant mode high frequency electromagnetic wave energy having a plane of polarization defined by the maximum electric intensity and the direction of propagation thereof at the operating frequency, and gyromagnetic material extending longitudinally in the path of and in energy coupling relationship with the wave energy guided by said structure, said material being magnetically polarized in a plane normal to the longitudinal extent of said material and being located significantly asymmetrically within the transverse cross section of said structure and symmetrically centered upon a line located between said plane of polarization and the boundary of said structure.

14. In combination, a wave guiding structure having a boundary of substantially uniform transverse cross section and continuous conductivity for high frequency electromagnetic wave energy, said energy when guided by said structure being characterized by a magnetic vector component which appears to rotate in a plane normal to said direction in first and second senses in different regions of the field pattern of said energy at the same transverse cross section of said structure as said energy propagates, and an element of gyromagnetic material magnetically polarized normal to said plane extending longitudinally through one of said regions in energy coupling relationship with said rotating component and so disposed to couple with energy of said first sense of rotation to a substantially greater extent than with energy of said second sense for a given direction of propagation of said energy.

15. The combination according to claim 14 including means for introducing linearly polarized electromagnetic waves into said structure at one point, and a load associated with said structure at another point for utilizing said waves after propagation from said one point to said other point in said given direction, said first sense of rotation being counterclockwise.

16. In combination, a wave guiding structure having a boundary of substantially uniform transverse cross section and continuous conductivity for high frequency electromagnetic wave energy, said energy when guided by said structure being characterized by a magnetic vector component which appears when viewed from a given direction to rotate in a plane normal to said direction in first and second senses in different regions of the field pattern of said energy at the same transverse cross section of said structure as said energy propagates, and an element of gyromagnetic material magnetically polarized normal to said plane extending longitudinally through one of said regions in energy coupling relationship with said rotating component and disposed with a substantially greater mass of said element in the region in which said energy rotates in said first sense than in the region in which said energy rotates in said second sense for one direction of propagation of said energy.

17. In combination, a wave guiding structure having a boundary of substantially uniform transverse cross section and continuous conductivity for high frequency electromagnetic wave energy, said energy when guided by said structure being characterized by a magnetic vector component which appears to rotate in a given plane in a region which is substantially removed from the center of said structure as said energy propagates, an element of gyromagnetic material extending longitudinally through said region in energy coupling relationship with said rotating component, and magnetic polarizing means for said element comprising a biasing magnetic field directed normal to said plane with the same orientation throughout all of said element of the positive direction of said biasing field with respect to the sense of rotation of said magnetic vector for a given direction of propagation of said energy.

18. In combination, a wave guiding structure having a boundary of substantially uniform transverse cross section and continuous conductivity for high frequency electromagnetic wave energy, said energy when guided by said structure being characterized by a magnetic component which appears to rotate in planes in regions which are substantially removed from the center of said structure, gyromagnetic material extending longitudinally within said structure in energy coupling relationship with said rotating component, and means for magnetically polarizing said material with a biasing magnetic field having a positive sense directed normal to said planes, the relationship between the sense of rotation of said rotating component and said positive sense being the same throughout all of said material for any given direction of propagation of said wave energy through said wave guiding structure.

19. In combination, a wave guiding structure having a boundary of substantially uniform transverse cross section and continuous conductivity for high frequency electromagnetic wave energy, said energy when guided by said structure in one direction therealong being characterized by a magnetic component which appears when viewed at one transverse cross section from a given reference to rotate in planes in first and second senses respectively in first and second different regions of the field pattern of said energy, and an element of gyromagnetic material magnetically polarized normal to said planes extending longitudinally in energy coupling relationship with said rotating component with a substantially greater mass of said element in said first region than in said second region.

References Cited in the file of this patent

UNITED STATES PATENTS

| | | |
|---|---|---|
| 2,464,269 | Smith | Mar. 15, 1949 |
| 2,607,849 | Purcell | Aug. 19, 1952 |

(Other references on following page)

UNITED STATES PATENTS

| | | |
|---|---|---|
| 2,644,930 | Luhrs | July 7, 1953 |
| 2,645,758 | Lindt | July 14, 1953 |
| 2,745,069 | Hewitt | May 8, 1956 |

OTHER REFERENCES

Miller: "Magnetically Controlled W G Attenuators," Journal of Applied Physics, vol. 20, No. 9, September 1949, pages 878–83.

Hogan: "The Ferromagnetic Faraday Effect at Microwave Frequencies," Reviews of Modern Physics, vol. 25, No. 1, January 1955, pages 253–63.

Hewitt: "Microwave Resonance Absorption in Ferromagnetic Semiconductors," Physical Review, vol. 73, No. 9, May 1, 1948, pages 1118–9.

"Principles of Microwave Circuits" (Montgomery et al.), published by McGraw-Hill (N.Y.), 1948; page 355, FIG. 10.18 relied on.

Sakiotis et al.: "Proceedings of the IRE," January 1953, pages 87–93.